Figure 1:
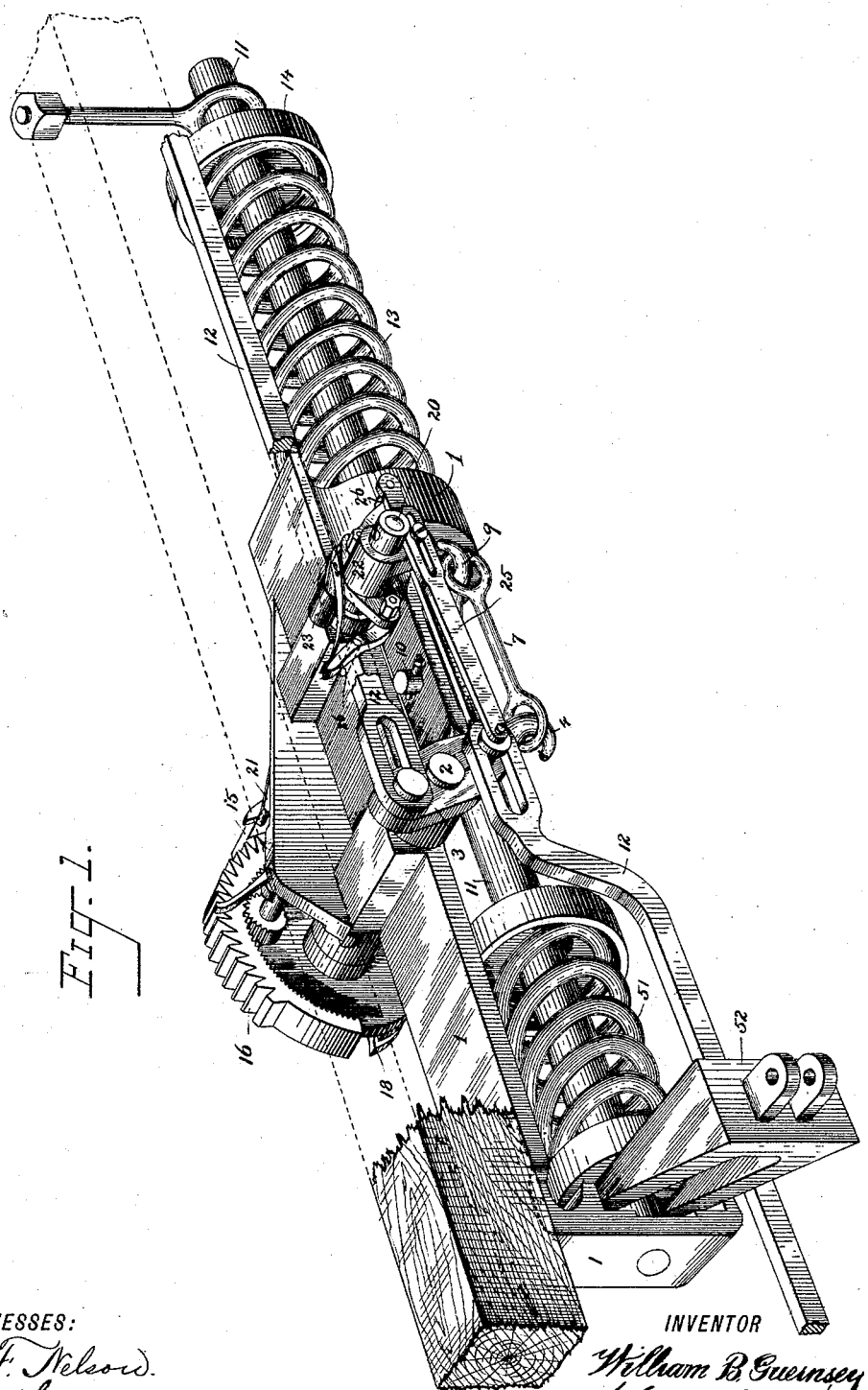

(No Model.)  7 Sheets—Sheet 1.

W. B. GUERNSEY.
AUTOMATIC CAR BRAKE.

No. 473,457. Patented Apr. 26, 1892.

WITNESSES:
John F. Nelson.
E. Arthur.

INVENTOR
William B. Guernsey
BY Knight Bros.
ATTORNEYS (No Model.) 7 Sheets—Sheet 2.
W. B. GUERNSEY.
AUTOMATIC CAR BRAKE.
No. 473,457. Patented Apr. 26, 1892.
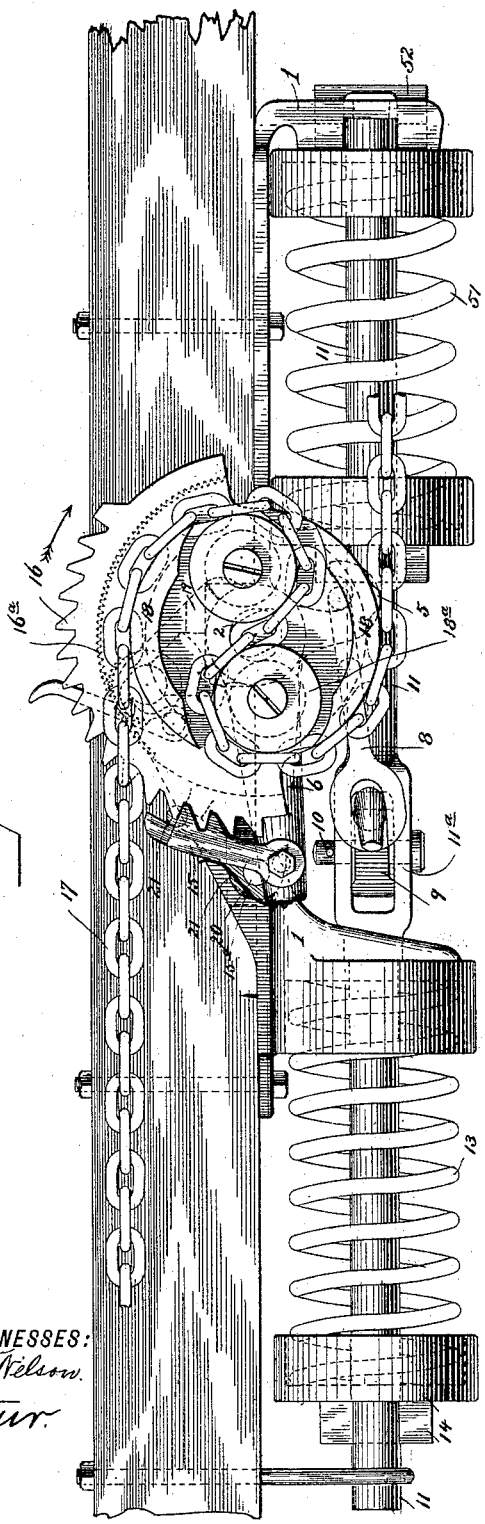
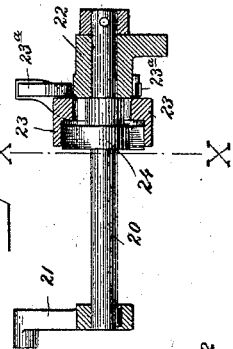
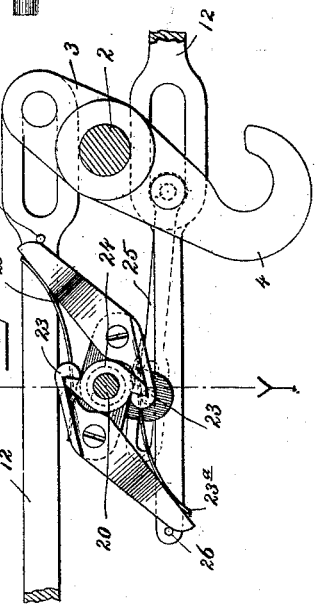
WITNESSES:
John F. Nelson
E. Arthur
INVENTOR
William B. Guernsey
BY Knight Bros.
ATTORNEYS (No Model.) 7 Sheets—Sheet 3.
W. B. GUERNSEY.
AUTOMATIC CAR BRAKE.
No. 473,457. Patented Apr. 26, 1892.
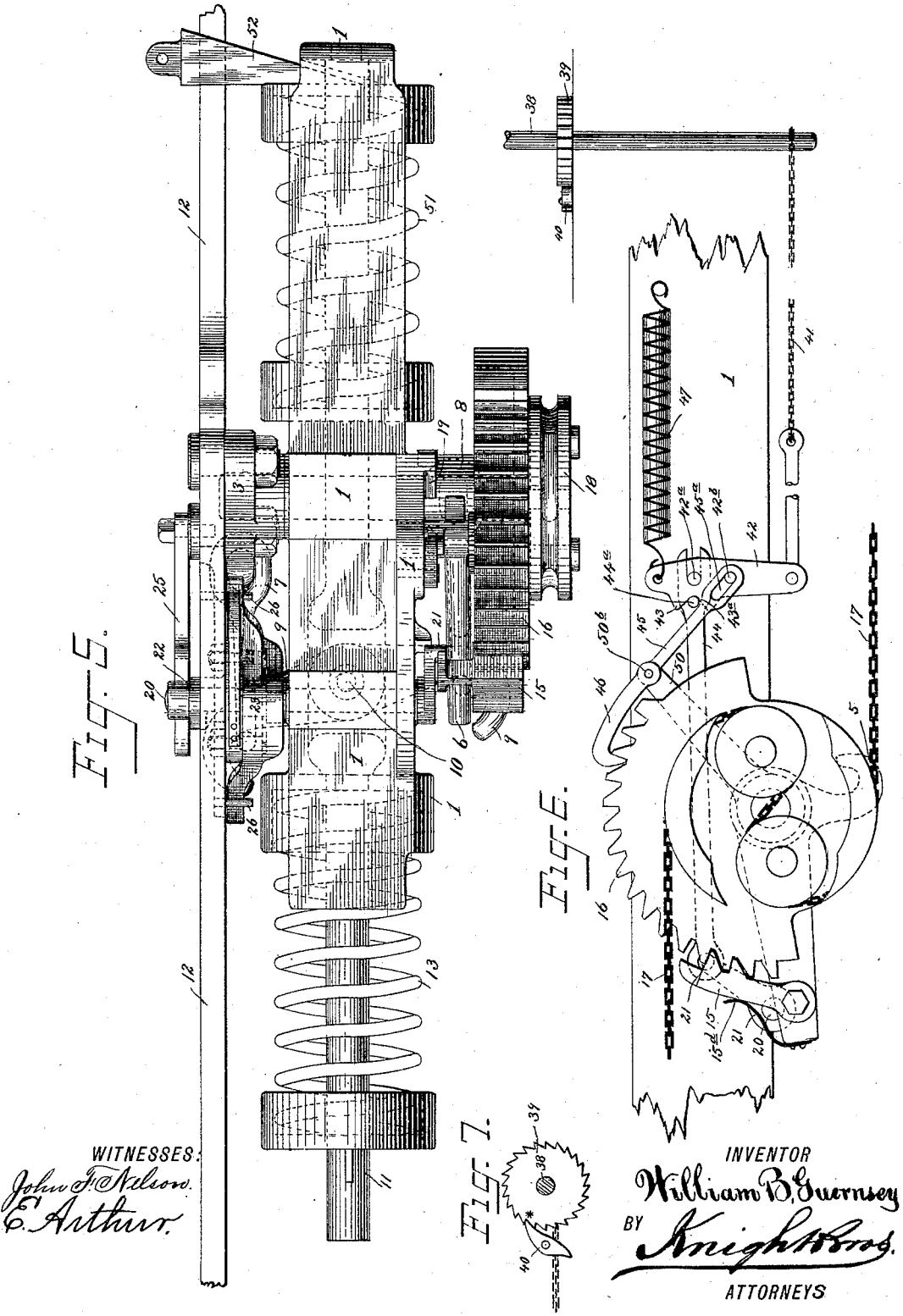

(No Model.) 7 Sheets—Sheet 4.
W. B. GUERNSEY.
AUTOMATIC CAR BRAKE.
No. 473,457. Patented Apr. 26, 1892.
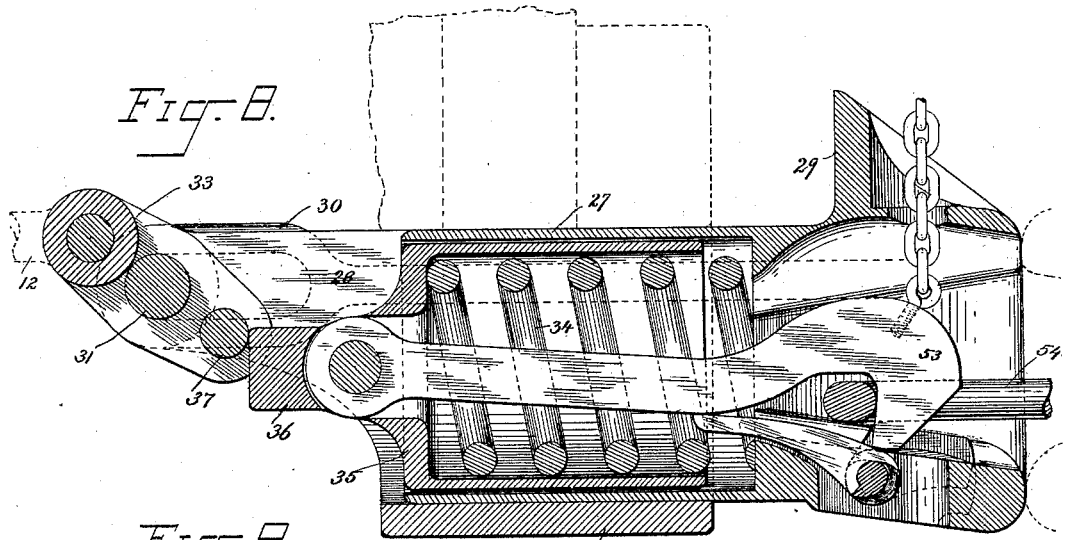
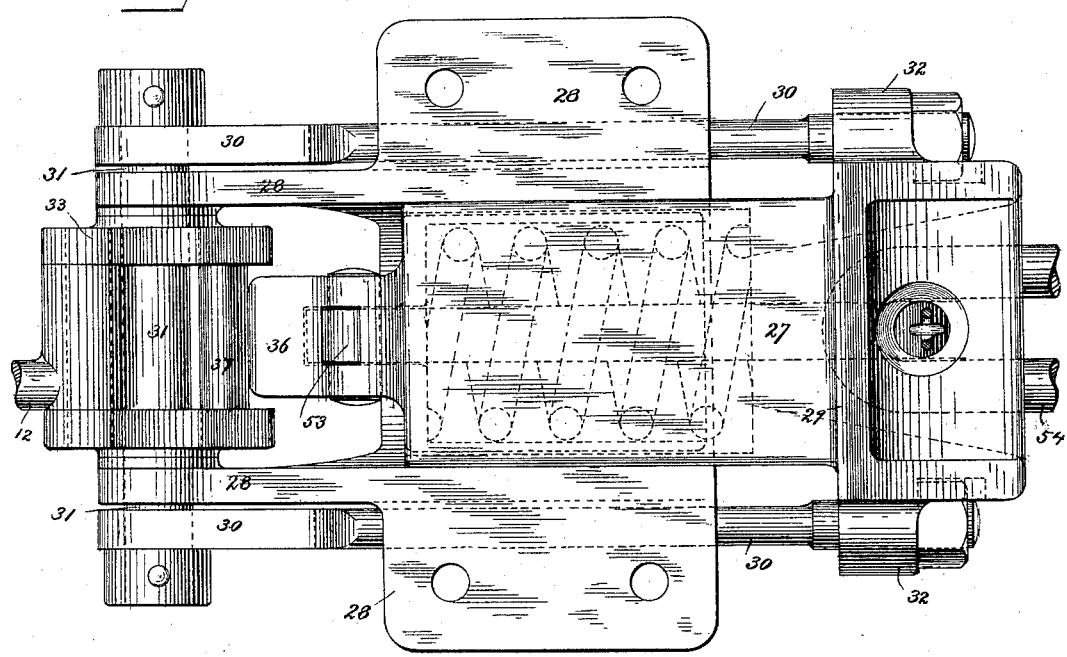
WITNESSES:
John F. Nelson
E. Arthur
INVENTOR
William B. Guernsey
BY Knight Bros
ATTORNEYS.

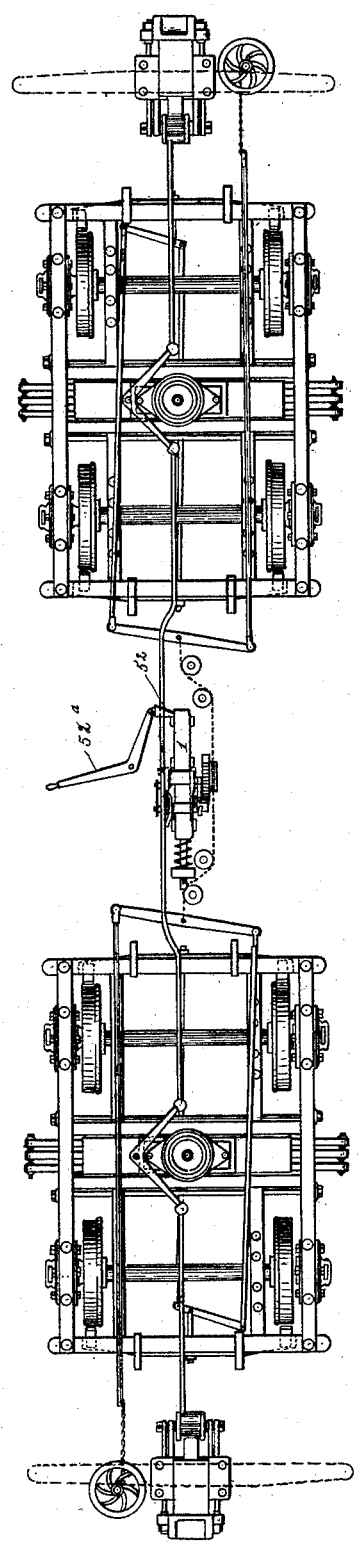

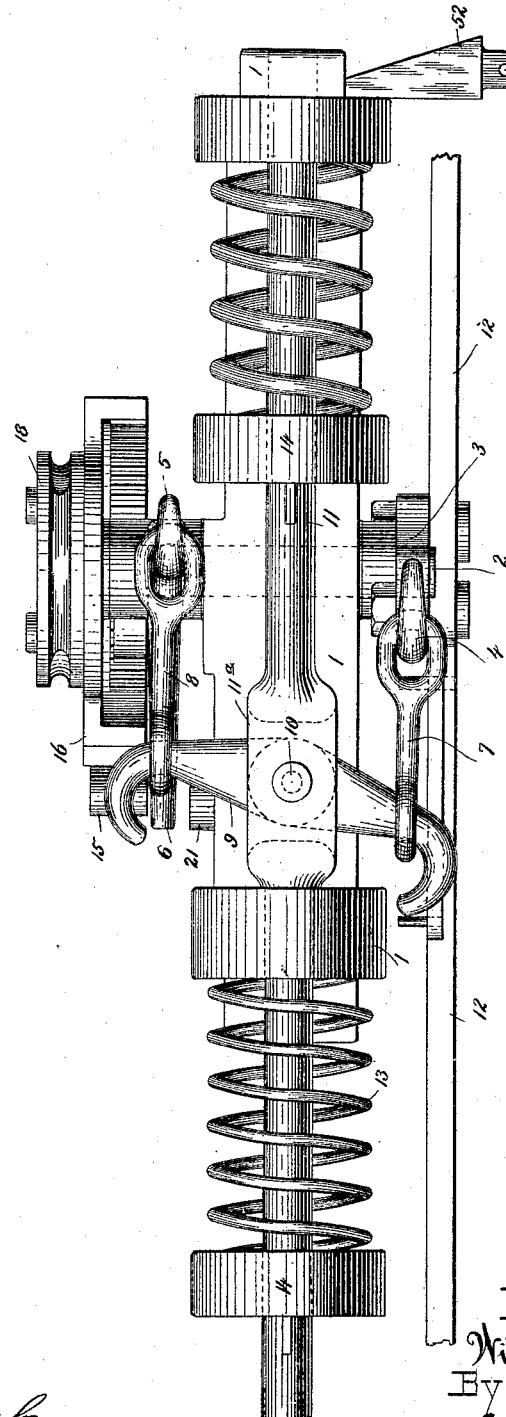

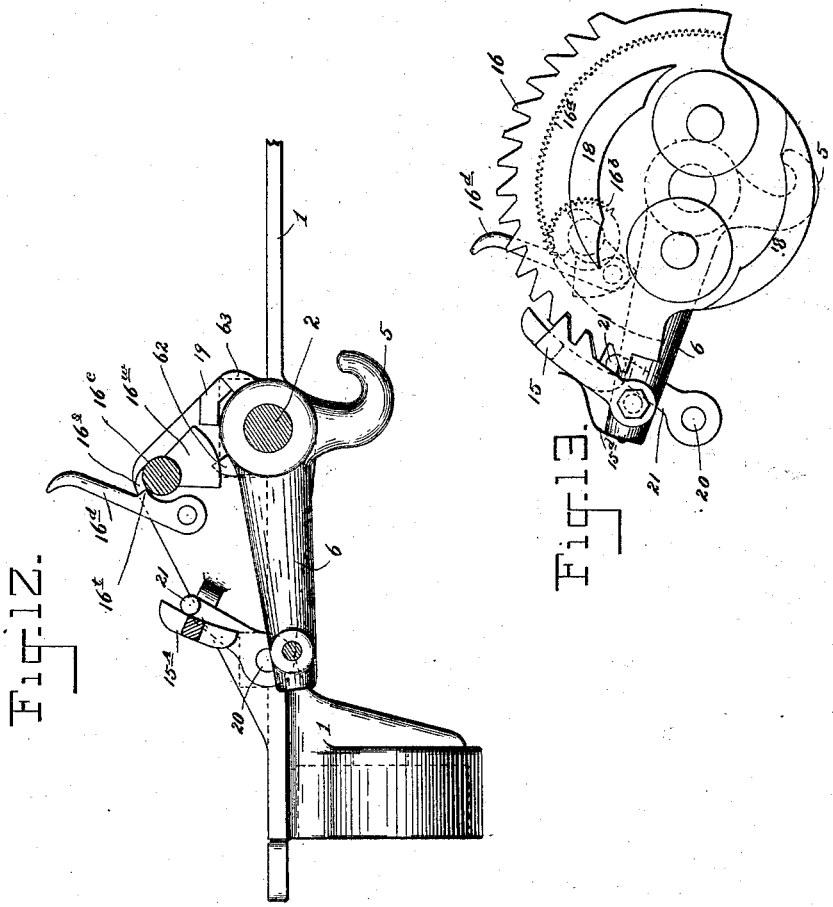

UNITED STATES PATENT OFFICE.

WILLIAM B. GUERNSEY, OF NORWICH, NEW YORK, ASSIGNOR TO JANE M. GUERNSEY, OF SAME PLACE.

AUTOMATIC CAR-BRAKE.

SPECIFICATION forming part of Letters Patent No. 473,457, dated April 26, 1892.

Application filed February 25, 1888. Serial No. 265,227. (No model.)

*To all whom it may concern:*

Be it known that I, WILLIAM BELLAMY GUERNSEY, a citizen of the United States, residing at Norwich, in the county of Chenango and State of New York, have invented certain new and useful Improvements in Automatic Car-Brakes, of which the following is a specification.

The invention is based upon a discovery or first observation and formulation of the relations which the two independent draw-heads or buffers of a car assume as regards each other in the various relations of said car with other cars and with train-motors in train or yard management to the following effect, to wit: When a car is to be moved by a compressed draw-head, brakes are not wanted. When cars are to be stopped by compressed draw-heads, brakes are wanted; and, further, whenever a car (forming part of train) has its leading draw-head compressed by said car's own momentum (in other words, when such a car is being stopped by compressed draw-head) its trailing draw-head (except when such car is the rearmost car in train) will also be practically simultaneously compressed by the momentum of the following cars, while under all other circumstances of train or car management the compression of the second draw-head can only happen after said car has been moved by the compression of the first draw-head a sufficient distance for the purpose. In other words, whenever the exigencies of train-service require "brakes" both draw-heads are being compressed simultaneously by momentum; but in cases where the second compression happens only as the result of force communicated through the car itself no action of the brakes is required. Thus when a train is to be stopped and brakes are wanted both draw-heads of each car are being compressed (practically) at once; but when a car or train is to be moved by compressed draw-heads, and consequently brakes are not wanted, the draw-heads are not compressed simultaneously, but successively.

My said invention consists in mechanism designed to emphasize this tendency to simultaneous action of the draw-heads (or buffers) in the one case and their independent action in the other and to make the practically simultaneous compressions apply and maintain "brakes on" and the single or independent compressions disable brakes, thereby obtaining an automatic adjustment system for momentum train-brakes more perfect than other and previous systems and entirely novel in its methods. It is this automatic action of the brake-machine upon the brakes and through the synchronous or differential action of the draw-heads that I have made use of in the form of my invention I am about to particularly describe, and it is this discovery embodied in any practicable form that the claims appended hereto are intended to cover. I also add novel devices for perfecting the practical operation of such brakes as follows: The mechanism, as shown in the present application, (being one of various practical forms devised for utilizing my said discovery,) consists, essentially, of a windlass made fast to the under side of a car and adapted to transmit compressive impulses from the draw-heads through the said windlass to the brake system, thereby applying brakes, and also of a tripping device, whereby initial independence of compressions of either draw-head causes the disabling of brakes or release of brakes already applied, and of further devices—to wit, an automatic device for keeping the slack of the brake-chain from accumulating beyond a fixed length of chain, so that like draw-head movements shall tend to produce substantially like results of brake-shoe pressure; a draw-gear that transmits compressions through its buffer-spring to the brake-machine, resulting in a direct fulcruming of all buffer strains upon and through the wheel-treads instead of partly upon the car-bodies, as usual; a connection between said brake-machine and the hand-brake mechanism affording a manual (although possibly unconscious) control of said machine, thus harmonizing the two systems and bringing the "automatic" into line with the ordinary usages and rules of railways; a construction of draw-head and coupling device that insures or tends to insure the desired actions or automatisms of the said brake-machine; a device for enabling the resulting brake-tensions to be varied at will between certain prearranged minimum and maximum limits, and other minor devices, the whole forming a complete train-brake system designed to be used in combination with an efficient power-brake upon the locomotive or locomotive and tender.

Referring to the accompanying drawings, which form a part of this specification, Figure 1 is a perspective view of my improved brake mechanism. Fig. 2 is a side elevation of same. Fig. 3 is a detail view and is drawn on the line X X, Fig. 4. Fig. 4 is a section on the line Y Y, Fig. 3. Fig. 5 is a plan view of my brake-machine. Fig. 6 is a side elevation of a slack-adjusting device. Fig. 7 is a detail view. Fig. 8 is a section of draw-head used in conjunction with the brake mechanism. Fig. 9 is a plan view of the same. Fig. 10 is a plan view of running-gear of a car, illustrating the complete brake system. Fig. 11 is a plan view of the under side of the brake-equalizing device. Fig. 12 is a side elevation showing certain details. Fig. 13 is a detail view of the windlass of the brake mechanism.

I first describe the brake-machine: A frame 1, securely bolted to one of the middle sills of a car between the body-transoms, affords a bearing for a shaft 2, passing transversely through it, on one end of which shaft the rock-arm 3 freely rotates under impulses from either of the pull-rods 12. A hooked extension 4 on the lower end of said rock-arm 3 connects with the hook 5, (which forms the short arm set at right angles,) of the pawl-bearing lever 6, also journaled on the said shaft 2, through the medium of a horizontal equalizer 9 and of links 7 and 8, connecting with opposite ends of the said horizontal equalizer, which equalizer is pivoted on a pin 10 in the jaws 11$^a$ of the compression-rod 11, so that when the rock-arm 3 is rotated by the said slotted pull-rods 12, or by either of them, the said pawl-bearing lever 6 is also rotated, or if stopped from further movement, as by the brake-shoes reaching the wheel-treads, the relief-spring 13 is compressed. This spring is held upon compression-rod 11 by key 14. Said lever 6, by its pawl 15, serves to rotate the ratchet-toothed wheel 16, which is also mounted upon shaft 2 and which by its rotation pulls in both directions upon the brake-chain 17 (attached at each end to the brake-gear of a truck) on the windlass 18, (forming a part of wheel 16,) thus applying the brakes. A stop 19 upon the frame 1 limits the movement of the pawl-bearing lever 6 in case the brake-chain is broken or pawl 15 is disengaged from said ratchet-teeth. This it does by means of the lug or shoulder 62 on the lever 6 coming in contact with the said stop. The lug or shoulder 63 limits the movement of the lever 6 in the other direction. This is illustrated in Fig. 12. A spring 15$^d$ serves to keep the pawl 15 engaged with ratchet-teeth of said wheel 16. When a draw-head is compressed, the rock-arm 3 is acted upon by the connecting pull-rod 12, rotating it upon its shaft 2, and so moving the equalizer 9 and applying brakes, as before described; but when the brake-shoes have reached their seating, so that further movement of pawl-arm is impossible, further compression of draw-head will expend itself in compressing the relief-spring 13. Simultaneous compressions of both draw-heads do the same work; but it evidently follows from the arrangement that if the draw-head movements are not simultaneous the leading draw-head does all the work in overcoming the resistance of the relief-spring 13. This feature is of importance as conducing to the automatism of the brake, for the reason that the hindrance it produces enables the following car to compress the trailing draw-head seasonably, thereby preventing the brakes from being released, as hereinafter described.

I will now describe the tripping mechanism: The frame 1 carries a small shaft 20, parallel with shaft 2, having fixed on one end a lift-lever 21, the normal position of which is bearing against the under side of the arm 15$^A$ of the said pawl 15, (see Figs. 2, 5, and 12,) so that a partial revolution of said shaft 20 will cause the said lift-lever 21 to force pawl 15 out of engagement with the teeth of the ratchet-wheel 16, (against the pressure of spring 15$^d$,) leaving the said wheel free to rotate backward and the chain 17 free to slack up, thus allowing the brakes to fall off and so remain until the operative draw-head shall have been again extended and compressed. Said movement of lift-lever 21 is caused solely by a device on the opposite end of the shaft 20, (see Figs. 3 and 4,) being automatically acted on by the slotted pitman 25, connecting with the rock-arm 3. This device consists of a loose sleeve 22, which carries two dogs 23, engaging (whenever free to do so) with the opposite teeth of cam 24, fixed on the shaft 20, as shown in Figs. 3 and 4. Partial compressions of either draw-head 27 effect a disengagement of the corresponding dog 23 with its cam-tooth 24 by means of a tripping-pin 26 on the connecting pull-rod 12, which bears against the arm of said dog 23, disengaging it, while it requires a yet further movement of the rock-arm 3 to rotate the sleeve 22 through or by means of the slotted pitman 25. Thus the practically simultaneous movement of both pull-rods 12 will have disengaged both dogs 23 before the operative or leading draw-head shall have so far completed its compression movement as to compel the rotation of sleeve 22, thus allowing the said sleeve 22 to be rotated upon its shaft 20 without affecting the lift-lever 21, and thereby leaving the pawl 15 engaged with the toothed wheel 16. Consequently the brakes will in such case remain on; but if only one draw-head is compressed only one of the said dogs 22 will have been tripped before the said sleeve 22 is compelled to its movement, in which case the pawl 15 would be forced out of engagement by the movement of said lift-lever 21 and the brakes will be released. Spring 23$^a$, as shown, or a counter-weight may be used to return the dogs 23 to their engagement with cam 24. It will be seen that an isolated movement of either draw-head first puts on and then trips or releases the brakes, while a sufficiently-simultaneous movement of both draw-heads puts on the brakes and maintains them on. The draw-heads 27 are supported at either end of the car by a strap or cradle 28, (see Figs. 8 and 9,) firmly bolted to the car-timbers, allowing the draw-heads a free movement longitudinally until limited in one direction by the brake-resistance or by the shoulder 29 on the draw-head coming in contact with the timbers of the car-body and in the other direction by the tension-rods 30, which are slotted at one end on a pin or shaft 31, passing transversely through ears on said strap 28, and at the other end fastened to draw-head 27 through lugs 32. Said shaft 31 also supports a rock-arm 33, which in response to inward thrusts of the draw-head 27 compels the buffer-spring 34 to force the after-follower 35 in the same direction, causing the push-block or bunter 36 on the after-follower 35 to come in contact with the cross-pin 37, (connecting the two projections of the lower end of the double rock-arm 33,) rotating said rock-arm and causing the upper end, to which the pull-rod 12 is connected, to move in the opposite direction, tending to apply the brake, as already described. If the buffer-spring 34 is of less resistance than the relief-spring 13, (as I intend,) the draw-head 27 will evidently be compressed to the full movement allotted to the buffer-spring 34, in addition to the movement which the said brake-machine allows to the after-follower 35. In other words, the draw-head 27, that is by its compression putting on brakes, is required to travel through a greater distance in proportion to the movement of its pull-rod 12 than is required of the lagging draw-head, which is meeting with no resistance, so that the lagging draw-head controls its trip-dog on brake mechanism by a less or shorter movement of compression than is required of the leading or operating draw-head, this being a desirable element in the automatism of my brake combination, as before stated. The windlass 18 is located upon the outer face of the mutilated ratchet-wheel 16 and is provided with two pulley-wheels 18$^a$, around which pulley-wheels is extended the brake-chain 17, said brake-chain being attached at either end to the brake-gear of a truck. When the mutilated wheel 16 is turned through the medium of pawl 15 and lever 6, it carries the windlass 18 with it and causes the two pulley-wheels 18$^a$, attached thereto, to wind up the brake-chain 17, thereby applying brakes.

I will now describe the device shown for automatically eliminating excessive slack from the brake-chain. On the inner periphery of ratchet-wheel 16 (see Figs. 12 and 13) are a number of spur-teeth 16$^a$, which mesh with a small mutilated spur-gear or pinion 16$^b$, mounted upon a stud 16$^c$ in the frame 1. This small wheel is controlled by counter-weight 16$^w$ or a spring, so that the tendency is to move in the direction of "off brakes," but can only move in such direction to the limit of a certain stop 16$^w$ as the tooth 16$^t$ of the latter comes in contact with the shoulder 16$^s$. As the wheel 16, which carries the brake-chain 17, can evidently move no farther in said direction than is thus permitted by said small wheel, I have a definite limit beyond which the brake-shoes cannot move away from the wheel-treads. In the other or brakes on direction the wheel 16 can move as far as the wheel-treads permit, but can only rotate the small wheel 16$^b$ as far as its (the small wheel's) teeth extend around its periphery. Consequently as every application of the brakes insures a taut brake-chain and the length of brake-chain allowed to be released from the windlass is controlled and limited to a given amount, it follows that like movements of drawheads must result in like brake-shoe pressures, and this until shoes are entirely worn through. The usual hand-capstan 38 has one of the teeth in its ratchet-wheel 39 plainly marked, as shown in Fig. 7, and when its pawl or dog 40 is engaged with said tooth the hand-brake chain 41 has moved the lever 42 into position shown. By further tensional movement of hand-brake chain 41 the cam 43 upon said lever 42 forces the push-rod 44 endwise through the medium of the pin 44$^a$ upon the aforesaid push-rod 44. The push-rod 44 is connected with the lift-lever 21, and when it is thrust in the direction indicated it will lift the said lever 21, thereby disengaging the pawl 15, and consequently rendering the automatic system inoperative for the time being. A continuing movement in the same direction of the lever 42 will apply the brakes through the consequent tension upon pull-rod 45 and the take-up pawl or dog 46, pivoted thereto. The pull-rod 45 and the take-up pawl or dog 46 are pivoted at the same point 50$^b$ to the rock-arm 50, which rock-arm is hung upon the shaft 2, so that its movement will be concentric with the periphery of the ratchet-wheel 16. The vertical lever 42 is pivoted at 42$^a$ to the frame 1, and the push-rod 45 is provided at its lower terminus with a slot 45$^a$, in which is inserted a pin 42$^b$ of the lever 42. When the said pin occupies the lowest position of the slot, as shown in Fig. 9, any tension applied to the hand-brake chain 41 will immediately act through the lever 42 and pull-rod 45 upon the take-up pawl or dog 46 for the purpose of applying brakes, as aforesaid; but when the hand-brake is not being employed and the automatic system is in use the rock-arm 50, with the pull-rod 45 and take-up pawl or dog 46, will drop of their own weight, the slot 45$^a$ permitting this action, which, as shown in the drawings, is sufficient to take up the ordinary movement. It will be seen, therefore, that unless the parts are in the position shown in Fig. 9 the automatic system will not work and that as soon as the hand-brake system comes into use the disablement of the said "automatic" will take place. I have carried out this principle still further, and have so constructed and arranged the parts that unless the ratchet-wheel 39 is stopped in its movement when unwinding by the pawl or dog 40 at the tooth marked in Fig. 7 further movement will cause a like disablement of the automatic by reason of the cam 43ª of the lever 42 coming in contact with the pin 44ª of the push-rod 44 and again thrusting out the pawl 15 by means of the lift-lever 21. This movement is caused by the spring 47, attached to the upper end of the lever 42, so that an entire disengagement of dog 40 of the hand-capstan 36 permits the spring 47 to accomplish the disablement of the automatic through cam 43ª and the push-rod 44. Thus if the brakes are put on by hand or if entirely free and disengaged the automatic system is disabled and useless; but if the dog 40 of the hand-capstan 36 is engaged with said marked tooth of the ratchet-wheel 39 the automatics are restored and in order for use in response to draw-head compression. This part of my invention is the result of observation to the effect that in railway service the hand-capstans are always free from restraint except where brakes are wanted, and that therefore uninstructed men could never experience hinderance (nor help) from momentums that could only operate when the capstan-dog was engaged with its ratchet, while instructed men would find no difficulty in using or releasing the momentums at will. This destroys wholly a prevalent objection to momentums that employés will need new "instructions" to prevent them from having bother with them. I disclaim all intention of fulcruming the two brake systems upon each other, that being a well-known device.

It is intended that the draw-heads shall have a movement of compression greater than is necessary to operate the tripping device and that this excess of movement may be made, if desired, to give a greatly-increased brake-pressure. To this end a supplemental spring 51 is shown, the resistance of which can be left at nothing or increased to any desirable extent by the less or further insertion of wedge 52, as shown in Fig. 1. A lever connection 52ª (see Fig. 10) may give facility to this adjustment. If buffer-spring 34 is made sufficiently long in its free length, the coupling together of two cars with a standard link will necessarily impose a tension upon said spring 34, and not only insure a close coupling, but whenever uncoupled serves to put a slight but sufficient pressure on the brakes by the spring 34 pushing against the after-follower 35, with the draw-head 27 for a fulcrum, so that accidental train partings will result in application of the brakes and in the consequent stopping of the rear section. This tension-coupling results from having the coupling pin or hook 53 attached to the after-follower 35 and the link 54 of such length that in order to couple the draw-head 27 requires to be compressed (by the draw-head of the coupling-car) upon the after-follower 35, putting an initial tension upon the buffer-spring 34, which can only be released by uncoupling.

It is currently believed that momentum-brake trains are, as compared to air-brake trains, peculiarly liable to "shock" and difficult of "graduation." This is a mistake. One assumption upon which the belief is based—to wit, that momentum-brakes apply successively from head to tail of train, while "quick-acting" air-brakes apply to all cars in longest trains simultaneously—is very wide of the truth. In fact, the brakes on the rear car of any train, however long, will be fully applied by a momentum system before they commence to apply by the most rapid pipe system unaided by electricity, and shock is entirely the effect of buffer-springs, aided by "free slack." This free slack I entirely eliminate by the described improvements in the couplers or buffers, although the hook-coupler in its "standard" form practically effects the same purpose, and the effect of the buffer-springs is largely restrained by the arrangement of my brake, which fulcrums them upon the brake-shoes, so that they have less tendency to force the cars apart, thus eliminating a chief cause of shock. Momentum-brakes are dependent for their efficiency upon the head break of the train, and are *per se* less liable to shock than any other braking device, for if the head of train has a constant stopping tendency in excess of any vehicle behind it and a greater resistance to acceleration by reason of the momentum of vehicles behind it it is evident that the train must be bunched by the use of its head brake and must then stay or remain closely bunched, as if it were one vehicle, until a final stop.

In describing my invention I have sufficiently explained its operation. In practical railroading momentum compressions of draw-heads occur only at such times as brakes are needed—to wit, during train slowings. At such times cars are squeezed endwise between adjacent cars and both draw-heads are compressed with an approach to simultaneousness, which tendency I emphasize by devices which put all the work of compression and of brake application upon the draw-head that leads in compression, compelling said leading draw-head to move in compression, say, twice as far before tripping and releasing brakes, as the lagging draw-head is obliged to move to prevent such tripping. Whenever cars are to be moved from rest or accelerated when in motion to the front by a compressed draw-head, (movements which are not effected by momentum,) the tendency is to fully compress such draw-head before the car can move forward over and upon its other draw-head. This tendency I can and in the present form of my invention do emphasize by making the compressed draw-head apply the brakes, thereby hindering the car from moving until the brakes are released by a fuller compression of the applying or motor draw-head. I thus obtain perfect automatism by adapting my devices to the service movements of the two independent draw-heads of a car. These devices may be varied almost indefinitely now that I have pointed out the way.

The real merit of my invention consists in the recognition of the opportunity afforded by said service movements of the draw-heads for the automatic governing or ordering of a momentum-brake system. It is this corelation of movements between the draw-heads that I use as the governing or regulating device for determining the action or non-action of the brakes in my brake system, and which I desire to protect by Letters Patent.

An automatic slack-adjusting device is a useful adjunct to a "lever" brake that is intended for practical use. Its action insures a practical uniformity of brake-work until the shoes are worn through and have become useless. It is, however, an adjunct rather than an integral portion of the brake device.

The automatic control exercised by the hand-capstan in its various positions is a very important, although not vital, feature of my system. With it, so long as the train is worked in accordance with the ordinary rules of railroading, the automatics will be ignored and useless, (powerless for good or harm,) and this without need of "adjusting devices" that if accessible give opportunity for malice, mischief, ignorance, stupidity, or carelessness to make the automatics a hindrance to the ordinary course of train or car management.

Trains equipped with this brake would ordinarily rely for stopping power while being backed upon the locomotive or hand brakes. If, however, brakes are set upon the caboose of a backing train that is first extended by the resistance of the locomotive, all automatics will be set in sequence by the train's own momentum, so that an engineer wishing to stop a backing train without stress upon the draw-heads has only to shut off steam from his engine and at the same time or an instant later to signal for brakes upon "caboose." To back a train from rest if brakes are on requires that the train be first extended in order to get the brakes off.

Automatics are intended for use as a train-brake in contradistinction to the hand or car brake. In the yard the hand-brakes are supposed to be either open or closed, and in either case my automatic (with the described hand-brake attachment) is disabled and useless for good or evil. It is only after a train is made up and in duty as a train that the automatics are intended for use, and then only when the train is in control of persons who know that to use the automatics the hand-brake requires a particular adjustment.

To "kick out a dog" is a natural and easy method of getting rid of a brake hindrance that is not wanted. But my device is so perfectly automatic that such adjustment control is almost in the nature of surplusage, for the automatic can always be left ready for use and will be no hindrance to pushing or backing engines, whether on road as trains or in the yard as cars, except the brakes be actually on at the time that backing is attempted. The springs 47 are adapted to release the brakes whenever pressure is withdrawn from the draw-heads.

Each machine is independent of every other and is operated by the draw-head compressions of its own car. It is therefore not necessary that the equipped cars be bunched or be placed in any particular part of the train. Cars having these brakes upon them and being scattered through a train will act automatically just the same and just as effectually.

In the construction of some classes of cars buffers and draw-heads are independent appliances. I desire it to be understood that whenever I have used the word "draw-head" as effecting certain results by inthrusts the same results could be accomplished by said independent buffers.

The use hereinbefore and hereinafter of the terms or expressions "the trip," "the tripping device," "the tripping mechanism," or "the governing device" is to be understood to relate to such a construction as is adapted to automatically disable, disconnect, or render temporarily inoperative the brake-applying mechanism, so that any continuation of any single compression on the oppositely-arranged draw-heads after the brakes are once thrown off will not effect the temporary disuse or inoperativeness of the brakes or in any manner reapply them to the wheel-treads; and it is to be distinctly understood that the utilization of the non-simultaneous action of the service movements of the draw-heads for rendering the brakes temporarily inoperative is effected and intended to be effected through the medium of any device that will respond to the aforesaid differential movements of the draw-heads and disable the braking mechanism sequentially and immediately.

Wherever I speak in the specification or claims of the two "opposite-ended" or "opposing" or "independently-moving" draw-heads, I refer and intend to refer to the draw-heads upon the same car, and whenever I speak of the "interaction" through the simultaneous or lack of simultaneous movement of the draw-heads I likewise refer to the draw-heads upon the same car and connected to the same brake-machine.

The phrase "foundation-brakes" is intended to describe or refer to the brake-beams and attached blocks or shoes, with hangers, levers, &c., that are always provided as a part of the car's construction and which are operated by the hand-capstan and by the power-brake, if any, indifferently.

It will be understood from the foregoing that I have disclosed the method of and reduced to a commercially-available device the apparatus for determining the opportune use and disuse of brakes upon railway-vehicles by a trip or disabling arrangement, combined with a brake-applying device and with the foundation-brake system, and depending their mutual operations upon the relative movements or positions of said vehicle's opposite-ended and independent draw or buffer heads, as will be particularly pointed out in the claims.

I claim as new and of my invention—

1. In a brake-applying mechanism for cars operated through the medium of longitudinally-moving draw-heads, a brake-machine adapted to apply or maintain brake-shoe pressures only when the initial inthrusts of the two draw-heads on the same car are practically simultaneous.

2. In a brake-applying mechanism for cars, the combination of a brake-machine with a disabling or tripping device which operates to prevent the application or the continuance of brake-shoe pressure under compulsion of certain related initial movements of the two independently-moving draw-bars.

3. In a brake-applying mechanism for cars operated through the medium of longitudinally-moving draw-heads, the combination of a brake-machine with a tripping or disabling device which operates to prevent the application or continuance of brake-shoe pressure whenever the inthrusts of the two draw-heads of a car are not sufficiently simultaneous.

4. In a system of momentum-brakes, the combination of the foundation brakes, the two oppositely-ended longitudinally-moving draw-heads or buffers, and a brake-machine connected to the said draw-heads and the foundation-brakes, so constructed and arranged as that it will automatically apply the brakes or fail to apply the brakes in response to the simultaneousness or lack of simultaneousness of the draw-head compressions.

5. In a car-brake, the combination of the oppositely-ended longitudinally-moving draw-heads or buffers, the foundation-brakes, connections between the draw-heads and foundation-brakes, a brake-applying device lying within said connections, and means, substantially as shown and described, for disabling the brake-applying device when the inthrust movements of the draw-heads are not sufficiently simultaneous.

6. In a momentum car-brake, the automatic brake-applying mechanism, in combination with the independently-operable draw-heads, to both of which the said braking mechanism is attached, and a tripping device constructed substantially as shown and described, all the parts being so arranged that an independent inthrust of either draw-head will first apply and then upon further inthrust movement release the brake.

7. In a momentum car-brake, the brake mechanism for applying the brakes under compulsion of inward thrusts of either draw-head, in combination with a tripping mechanism for releasing the brakes in further response to such inward thrusts of one draw-head as are not balanced by corresponding inthrusts practically simultaneous of the opposite draw-head upon the same car.

8. In a car-brake, substantially as hereinbefore shown and described, the combination of the two draw-heads or buffers capable of independent motion, connections therefrom through a brake mechanism to the foundation-brake levers, and means for automatically disabling the brake mechanism and releasing the brakes if such movement of the draw-heads or buffers is not sufficiently simultaneous, as set forth.

9. In a car-brake, the combination of the foundation-brakes, two oppositely-ended longitudinally-moving draw-heads or buffers, connections from said draw-heads or buffers to the brakes, brake-applying mechanism lying within and forming part of said connections, and means, substantially as shown and described, for temporarily disabling or disconnecting said brake-applying mechanism when the inthrust movements of the draw-heads are not sufficiently simultaneous.

10. In a car-brake, substantially as hereinbefore shown and described, the combination of the oppositely-arranged and independently-acting draw-heads or buffers located at the respective ends of the car, connections therefrom to foundation-brake levers through a brake-applying mechanism operable by the movement of the said draw-heads or buffers, and a tripping or disabling device to release or prevent the operation of the brakes when the draw-head movements are non-simultaneous or differential, all the parts being so arranged as that the brakes will remain off during the continuation of the same compression.

11. The combination, in a momentum car-brake, of the draw-bars or buffers, a spring common to both, connections between said draw-bars and spring, whereby said spring offers its total resistance to the movement of the one of the draw-bars which is in advance of the other, or if they advance simultaneously then to both, a system of foundation-brakes, and a brake-applying mechanism, all arranged substantially as and for the purposes set forth.

12. In a car-brake, the combination of the independent draw-heads, the buffer-springs, the brake mechanism connected to the draw-heads through the buffer-springs and provided with a tripping device, and the foundation-brakes connected to the brake mechanism, all adapted to operate substantially as and for the purposes set forth.

13. In a car-brake, a brake-applying mechanism, combined with the two draw-heads and buffer-springs of the car, so as to be operated by either or both of the draw-heads through the buffer-springs, the said braking mechanism being connected to the brake-levers, as shown and described, and so constructed as that when operated independently by either draw-head alone it will first apply and then, upon further draw-head movement, release the brakes.

14. In a car-brake, substantially as hereinbefore described, the combination of the independent draw-heads or buffers, a braking mechanism having a relief-spring, the said draw-heads having buffer-springs of less resistance than the relief-spring, so that the leading draw-head is obliged to travel a greater distance in compression than is necessary to its fellow, the lagging draw-head.

15. The combination, in a momentum-brake system for trains, of the longitudinally-moving draw-heads or buffers connected to the brake-machine and provided with buffer-springs, with the coupling device constructed substantially as shown and described, that imposes a tension whenever two cars are coupled upon the respective buffer-springs, thereby eliminating all free slack and tending to maintain a close contact of the coupled draw-heads, as set forth.

16. In an automatic train-brake, the combination of the longitudinally-moving draw-heads or buffers having buffer-springs, as shown, the braking mechanism connected therewith, and a coupling device imposing a tension on the buffer-springs when the cars are coupled, so that an accidental uncoupling will compel the buffer-springs to apply the brakes.

17. The combination of the hand-brake capstan having a ratchet and dog with a device operated by said hand-capstan, which in response to movements of said capstan which are insufficient for the application of brakes engages or disengages a momentum brake-machine or windlass from compulsion of the draw-heads, so that the position of the hand-capstan shall determine the movement or non-movement of the momentum-windlass or its equivalent and the consequent application or non-application of the momentum-brakes.

18. In an automatic or momentum brake, the combination of foundation-brakes, the momentum draw-head brake mechanism connected therewith, the hand-capstan connected to the foundation-brakes for the purpose of operating the same, said hand-capstan being so constructed and arranged as that when sufficiently rotated in either direction the actuation of the brakes from the draw-heads will be prevented.

19. In combination with a capstan or windlass 16 for applying brakes, a gear or its equivalent $16^d$, a mutilated stop-wheel $16^b$, which by reason of its mutilation does not hinder the movement of the said windlass or capstan in the direction of "putting on brakes," but which by reason of its stop $16^d$ prevents the return movement and consequent unwinding of the brake-chain beyond the desired limit of its allowable slack, as set forth.

20. In combination with an automatic or momentum brake mechanism, a tripping device for releasing the brakes, consisting, essentially, of a loose sleeve carrying two tripping-dogs normally engaged with one or two fixed teeth in the tripping-shaft, each tripping-dog being arranged to be lifted out of engagement by its respective draw-head when making an inthrust, and a lift-lever fixed to the tripping-shaft and engaging under the actuating-pawl of the brake mechanism, all arranged substantially as and for the purposes set forth.

21. In a momentum car-brake, the combination of the longitudinally-moving draw-head or buffer, a buffer-spring, an after-follower, a rock-arm for receiving the inward thrusts of the after-follower, all arranged at one end of the car, the braking mechanism connected to the rock-arm by pull-rod, a second pull-rod connecting the braking mechanism to a similar construction at the opposite end of the car, and means for equalizing in the brake mechanism the compressions received from the opposed draw-heads, substantially as shown and described.

22. In a momentum car-brake, the combination of the longitudinally-moving draw-heads or buffers provided with buffer-springs of a certain resistance, the braking mechanism constructed and arranged substantially as shown and described, and a relief-spring of greater resistance than the buffer-springs, said relief-spring having means of adjustment whereby the pressure of the brake-shoes may be altered and determined.

23. The brake-applying mechanism hereinbefore shown and described, connected to the draw-heads of the car and to the brake-shoes and levers, as shown, and consisting, essentially, of the windlass, the ratchet-wheel, and actuating-pawl, said actuating-pawl being operated by draw-head inthrusts, which in turn operates the ratchet-wheel, windlass, brake-levers, and brakes, substantially as set forth.

24. In a momentum car-brake, the combination of the longitudinally-moving draw-head or buffer, the buffer-spring, the after-follower, the rock-arm for receiving the inward thrusts of the after-follower, the braking mechanism connected to said rock-arm by the pull-rod, brake-levers and brakes, and means for connecting them to the braking mechanism, substantially as shown and described.

25. In a momentum car-brake, the combination of the longitudinally-moving draw-head or buffer, the after-follower, the buffer-spring, the rock-arm for receiving the inward thrusts of the after-follower, the pull-rod attached to the rock-arm and extending to and attached to the braking mechanism, the windlass upon said brake-machine, and means for applying brakes, all arranged substantially as and for the purposes set forth.

26. In a momentum car-brake, substantially as hereinbefore shown and described, the longitudinally-moving draw-heads or buffers provided with buffer-springs, after-followers incasing said buffer-spring, rock-arms for receiving the inward thrusts of the after-followers, and pull-rods extending to a braking mechanism, in combination with said braking mechanism, having a rock-arm to which both the pull-rods are attached, a windlass connected with said rock-arm, braking-levers, and brakes connected to said windlass by a brake-chain, all adapted to operate substantially as and for the purposes set forth.

27. In a momentum-brake, the combination of the oppositely-arranged and longitudinally-moving draw-heads or buffers provided with buffer-springs of certain resistance, and after-followers for receiving the inward thrusts of the springs, with a braking mechanism provided with a brake-windlass, and a relief spring or springs of greater resistance than the buffer-springs for receiving further compressions of the draw-heads when the brake-shoes are fully on.

28. In a momentum car-brake, the combination of the independent oppositely-arranged and longitudinally-moving draw-heads or buffers provided with buffer-springs of a certain resistance, the after-followers, the rock-arms, the pull-rods, the braking mechanism connected to the pull-rods and to the braking-levers and brakes through means substantially as shown and described, and provided with one or more relief-springs of greater resistance than the buffer-springs, a compression-rod common to both the springs and provided with keys, and means for adjusting the tension of the springs, all arranged substantially as and for the purposes set forth.

29. In a momentum car-brake, a longitudinally-operating draw-head or buffer provided with a buffer-spring of certain resistance, in combination with the opposite draw-head similarly equipped, the intermediate mechanism common to both the draw-heads, the compression-bar, the equalizing-bar pivoted therein and connected through the medium of a windlass to the brakes, one or more relief-springs of greater resistance than the buffer-springs sliding on and connected to the longitudinally-moving compression-bar, with means of adjustment of said spring or springs, as shown and described.

30. In a momentum car-brake, the combination of the independent oppositely-arranged and longitudinally-moving draw-heads of the car, with a brake-applying mechanism connected therewith, and consisting, essentially, of a rock-arm for receiving the draw-head movements, a horizontal equalizing-bar having a relief-spring, a windlass provided with a ratchet-toothed wheel, a pawl and pawl-bearing lever for operating the wheel, suitable connections between the rock-arm and the equalizer, and the pawl-bearing lever, the brakes and the brake-levers, and a brake-chain connected to the windlass and common to both brake-levers, all arranged substantially as described, and for the purpose set forth.

31. In a momentum car-brake, the combination of the oppositely-arranged and longitudinally-moving draw-heads or buffers provided with buffer-springs of a certain resistance, and after-followers, as shown, with a braking mechanism connected to the after-followers and provided with a rock-arm, a horizontal equalizing-bar pivoted in a compression-rod carrying one or more relief-springs of greater resistance than the buffer-springs, a windlass having a ratchet-toothed wheel, suitable connections between the equalizer and the other parts, the brake levers and shoes, and the brake-chain extending between said levers and the aforesaid windlass, all arranged as shown and described, and for the purposes set forth.

32. In a momentum car-brake, the combination of the independent oppositely-arranged and longitudinally-moving draw-heads or buffers, the braking mechanism common to both draw-heads, and the brake-levers, chain, and brake-shoes connected to the braking mechanism, the latter consisting of a rock-arm, a windlass having a ratchet-toothed wheel and two pulley-wheels, around which the brake-chain is wound, a lever carrying a pawl engaging with the toothed wheel, and equalizer and links connecting it with the rock-arm and pawl-bearing lever, all arranged substantially as and for the purposes set forth.

33. In a momentum-brake, the combination of the independent oppositely-arranged and longitudinally-moving draw-heads, a braking mechanism connected with both of said draw-heads and provided with a windlass having a ratchet-toothed wheel with spur-teeth upon its inner periphery, a mutilated gear or pinion meshing therewith and mounted upon the frame and provided with a counter-weight or spring, and a stop for limiting its retrograde movement, the parts being so arranged as that when the windlass, through the wear upon the brake-shoes, rotates beyond a certain point the pinion-gear will take up and eliminate this additional movement upon the release of the brakes.

34. In a momentum car-brake, the combination of the independent oppositely-arranged and longitudinally-moving draw-heads, the braking mechanism common to both draw-heads and connecting to the braking-levers, chain, and shoes, and provided with a take-up consisting of a wheel having spur-teeth on its inner periphery, a mutilated pinion pivoted to the frame and meshing with the spur-teeth and provided with a counter-weight or spring on one side and a stop on the other, and a dog pivoted in the frame and provided with a tooth for engaging with the aforesaid stop, all adapted to operate substantially as and for the purposes set forth.

35. In a momentum car-brake, the combination of the longitudinally-moving draw-heads, the brake mechanism connected thereto, two independent pull-rods or their equivalents slotted, as described, and lying in and forming part of the connections between the brake-machine and the draw-heads, whereby the brakes may be applied by independent inthrusts of either draw-head or simultaneous inthrusts of both draw-heads.

WILLIAM B. GUERNSEY.

Witnesses:
 HERBERT KNIGHT,
 JOHN F. NELSON.